Figure 1:
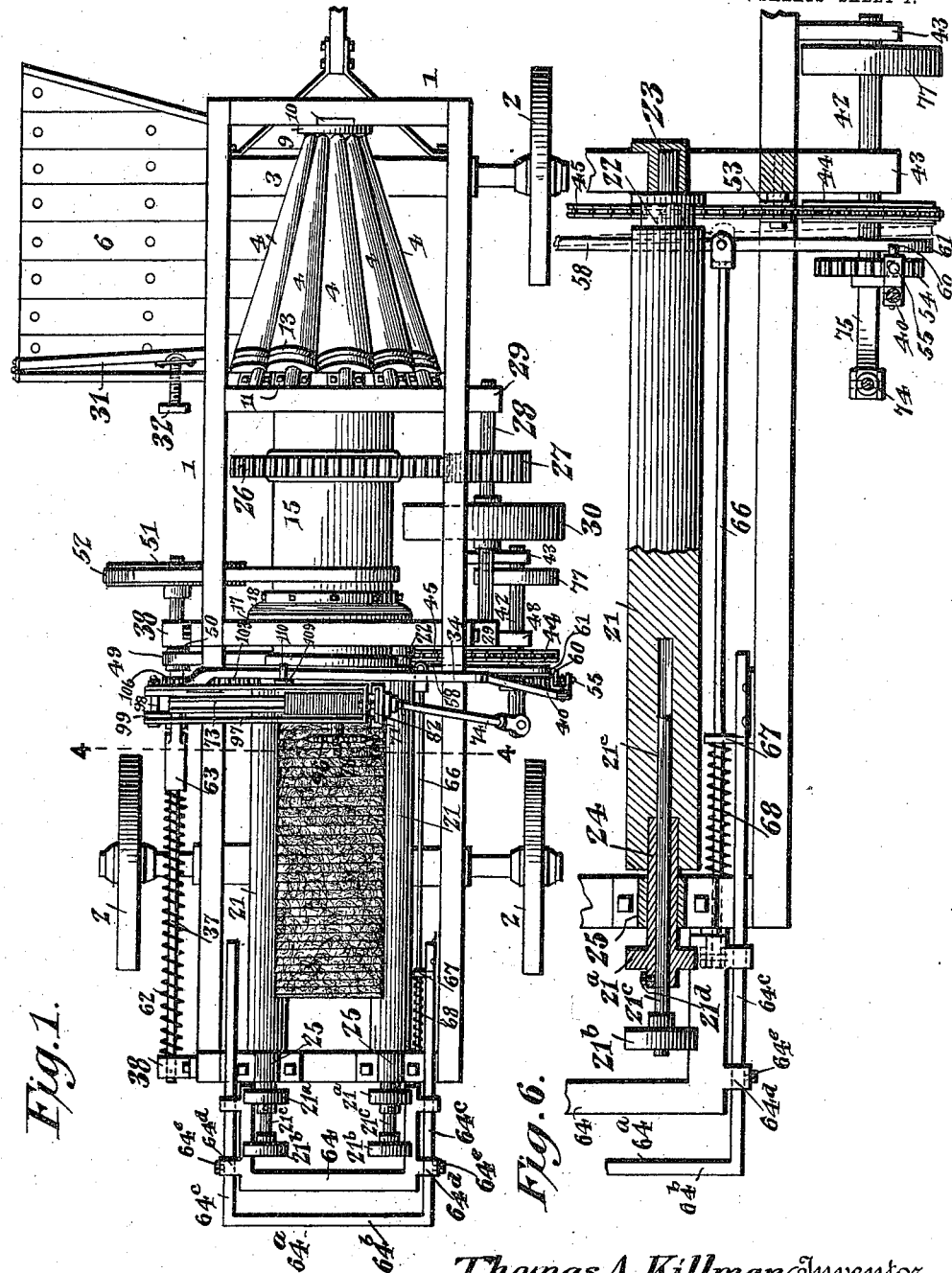

T. A. KILLMAN.
BALING MECHANISM.
APPLICATION FILED APR. 17, 1906. RENEWED OCT. 11, 1909.

963,775.

Patented July 12, 1910.
7 SHEETS—SHEET 1.

T. A. KILLMAN.
BALING MECHANISM.
APPLICATION FILED APR. 17, 1906. RENEWED OCT. 11, 1909.
963,775.
Patented July 12, 1910.
7 SHEETS—SHEET 5.
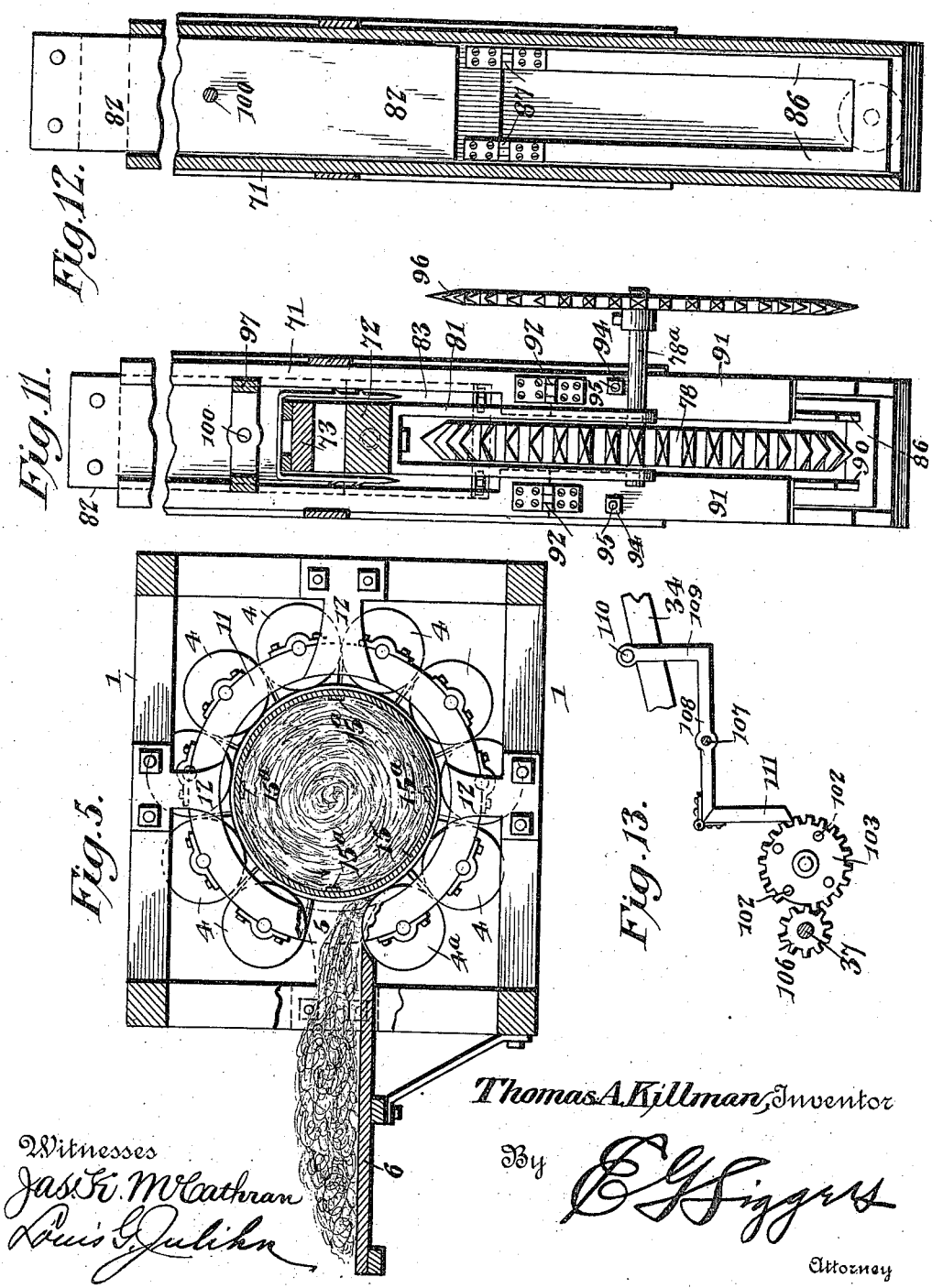
Thomas A. Killman, Inventor
Witnesses
By
Attorney

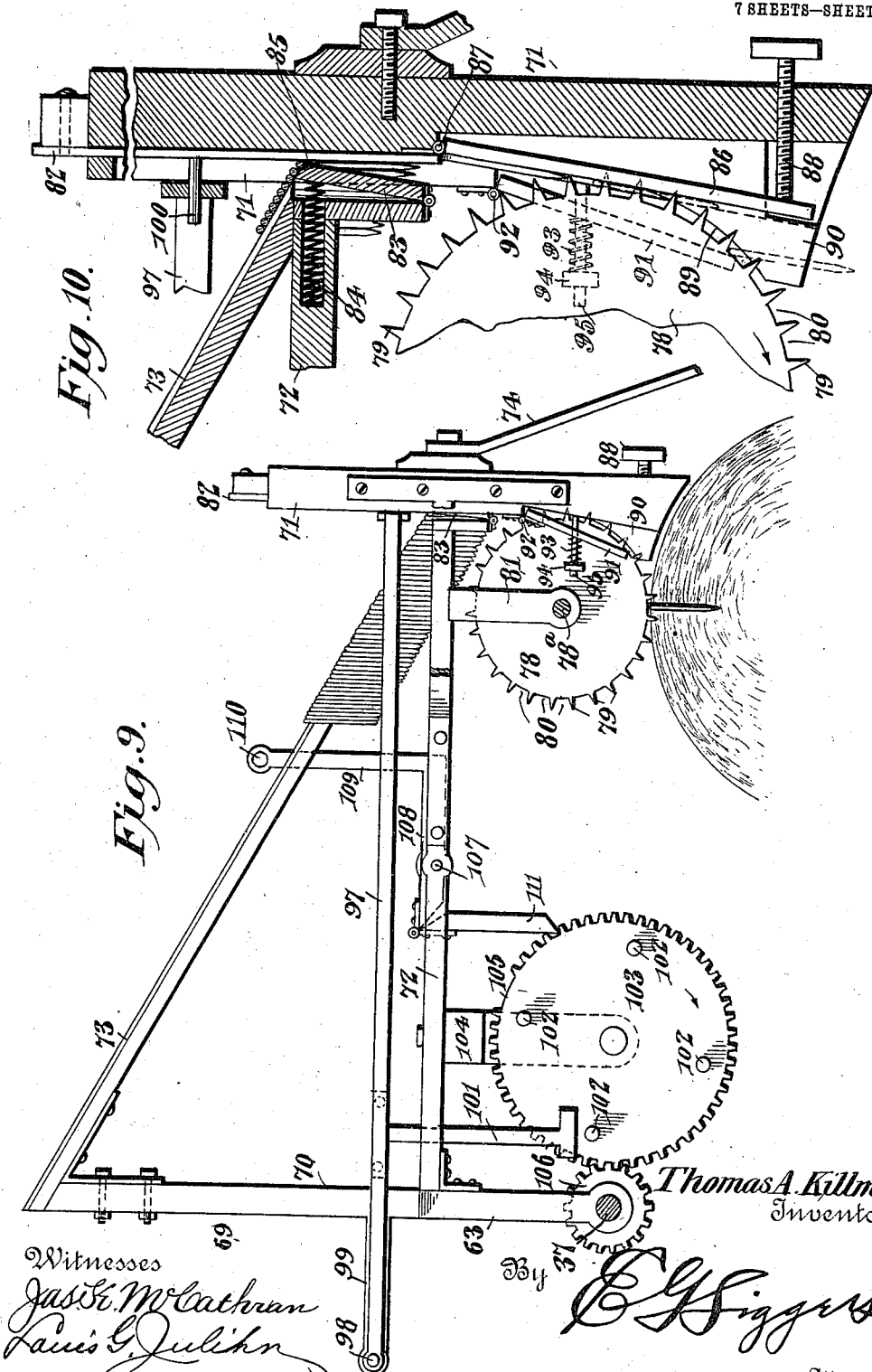
T. A. KILLMAN.
BALING MECHANISM.
APPLICATION FILED APR. 17, 1906. RENEWED OCT. 11, 1909.
963,775.
Patented July 12, 1910.
7 SHEETS—SHEET 6.

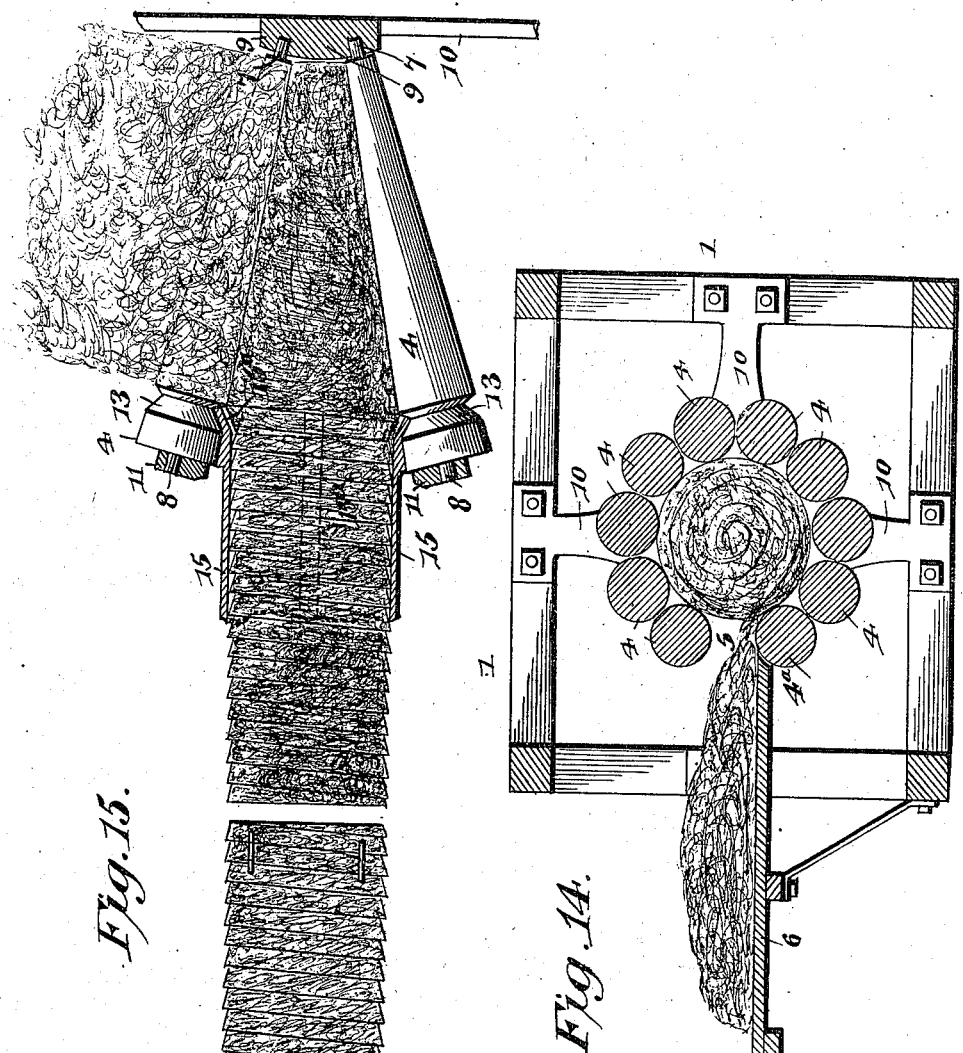

UNITED STATES PATENT OFFICE.

THOMAS A. KILLMAN, OF LIBERTY, TENNESSEE, ASSIGNOR TO CYRUS KEHR, TRUSTEE, OF KNOXVILLE, TENNESSEE.

BALING MECHANISM.

963,775. Specification of Letters Patent. Patented July 12, 1910.

Application filed April 17, 1906, Serial No. 312,225. Renewed October 11, 1909. Serial No. 522,181.

*To all whom it may concern:*

Be it known that I, THOMAS A. KILLMAN, a citizen of the United States, residing at Liberty, in the county of Dekalb and State of Tennessee, have invented a new and useful Baling Mechanism, of which the following is a specification.

My present invention relates to baling mechanism, but has reference more particularly to novel apparatus for forming cotton, hay, straw, excelsior, or other fibrous material into cylindrical bales from a mass of loose staple or stock. Various modes of accomplishing this general result have been proposed, but with those modes with which I am familiar it has been impossible to form bales of the required uniform density, stability, and capability of being readily disorganized at the mill.

The object of my invention is to produce an apparatus completely automatic in its operation and capable of producing cylindrical bales of uniform maximum density, made up of layers subjected to initial or detail compression, as well as compression in bulk, and so inter-related that the bale will be in effect self-tied or bound in order that the bale-ties or casings, ordinarily employed to insure the stability of the bale, may be entirely dispensed with. A bale possessing the recited characteristics will necessarily facilitate the storage and shipment of the baled material, since a maximum quantity of fiber will be condensed in a minimum of space; it will be rendered slow-burning and substantially moisture proof by the expression of air from the fibrous mass; the layers or increments will be capable of easy removal at the mill; and the cost of baling will be decreased by the elimination of the bands, ties, or casings ordinarily necessitated by the lack of inherent stability in ordinary bales.

To the accomplishment of the object stated, the invention resides in providing simple apparatus by means of which a body of fiber of conical form is rotated in proximity to a series of compression members, so related to a body of loose fiber, that the latter will be drawn between the compression members and the rotating body of fiber and subjected to an initial or detail compression, to form a layer or bat which is wound upon the body of fiber by the rotation thereof, and subsequently subjected to compression in bulk as said layer is surrounded by other layers and becomes an integral part of the bale structure.

In addition to the mechanism for forming the bale, bale-stock, or column, in the manner stated, the invention also comprehends the employment of automatic means for severing the continuously formed column or cylinder of material into bale-lengths or bales, means for stapling the final layers of fiber at the rear ends of the bales to prevent unraveling of the latter; means for regulating the lengths of the bales; and means for regulating the density of the bales.

Other novel features of construction and arrangement, subordinate to those referred to, will appear during the course of the succeeding description.

Figure 2:
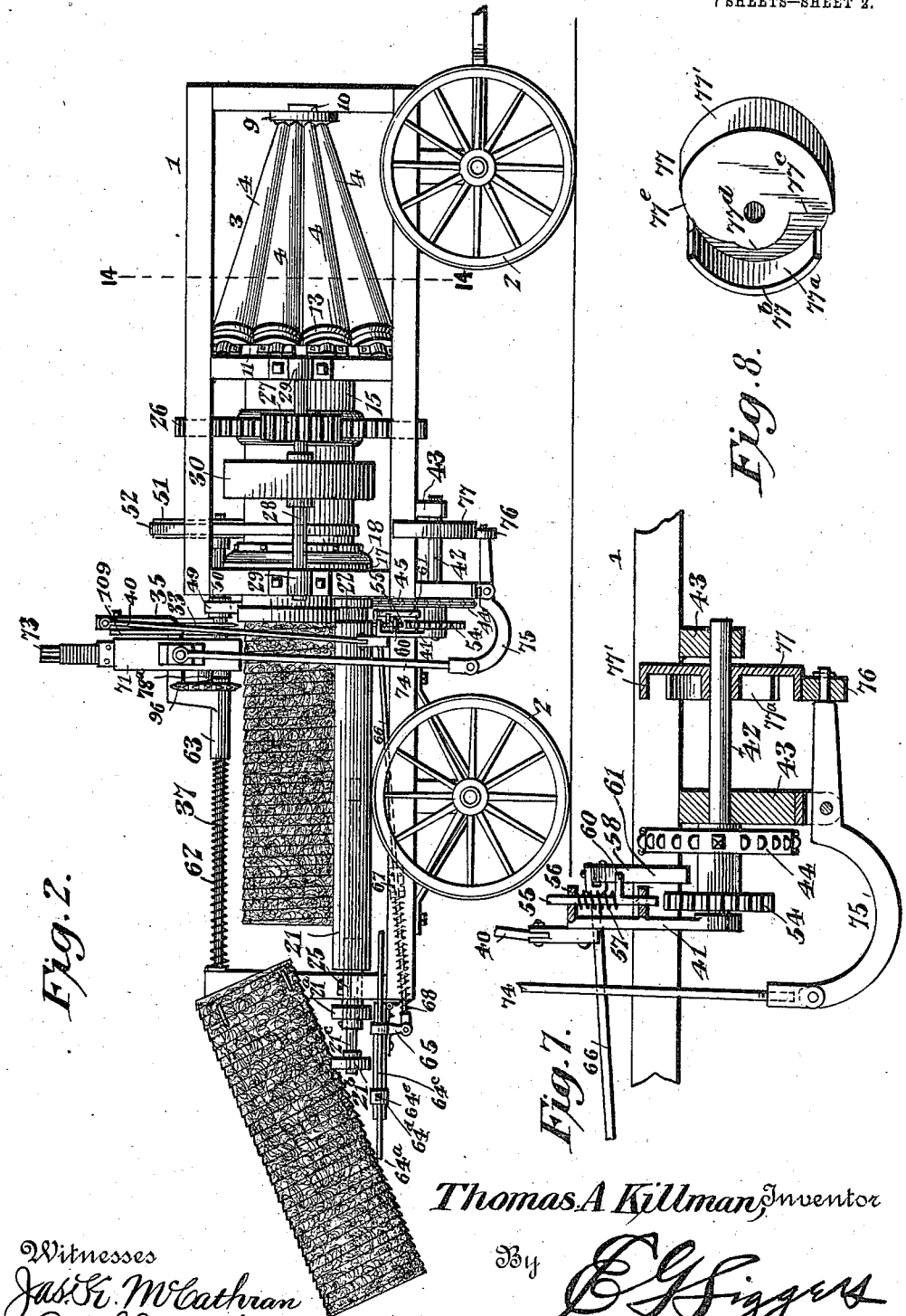
Figure 3:
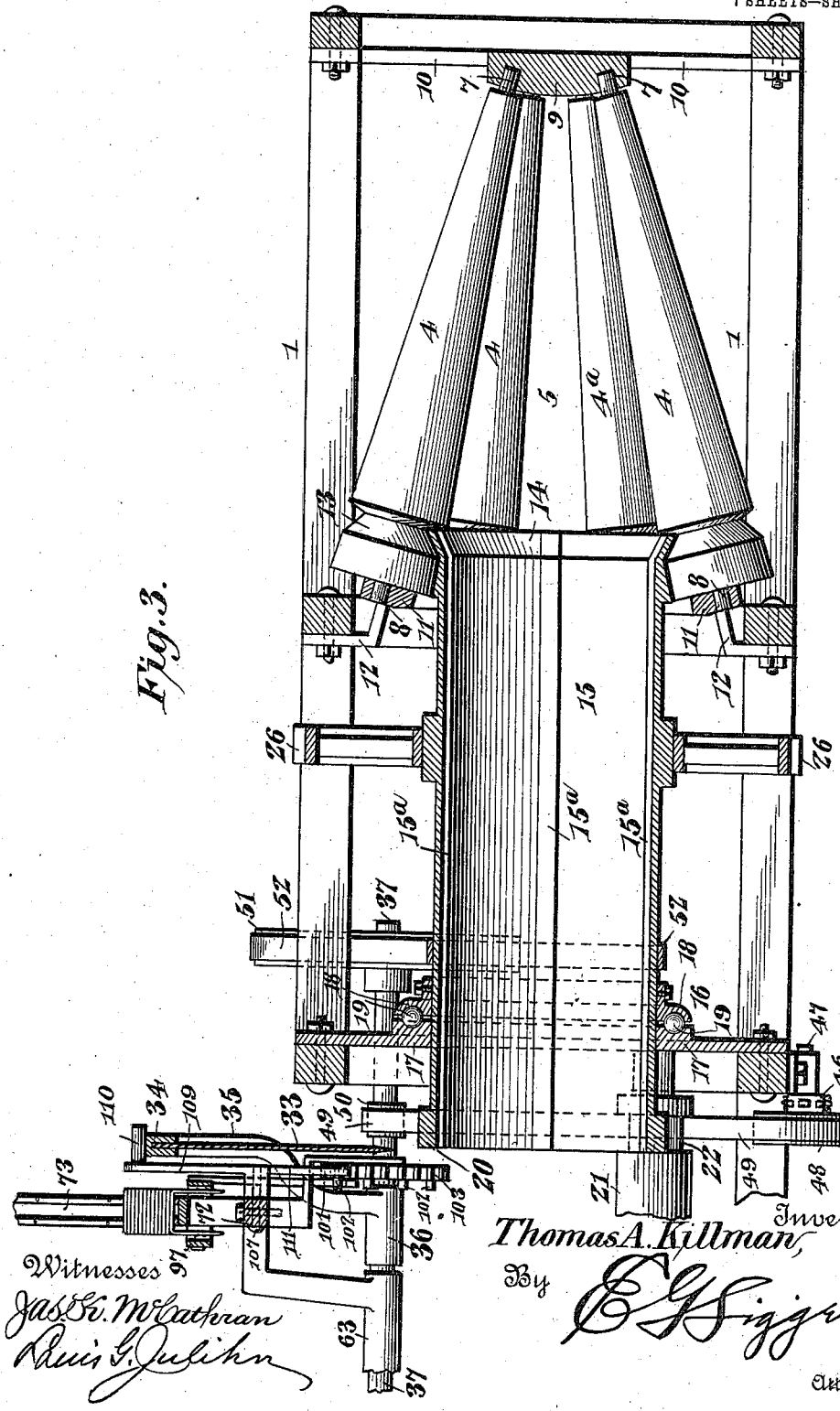
Figure 4:
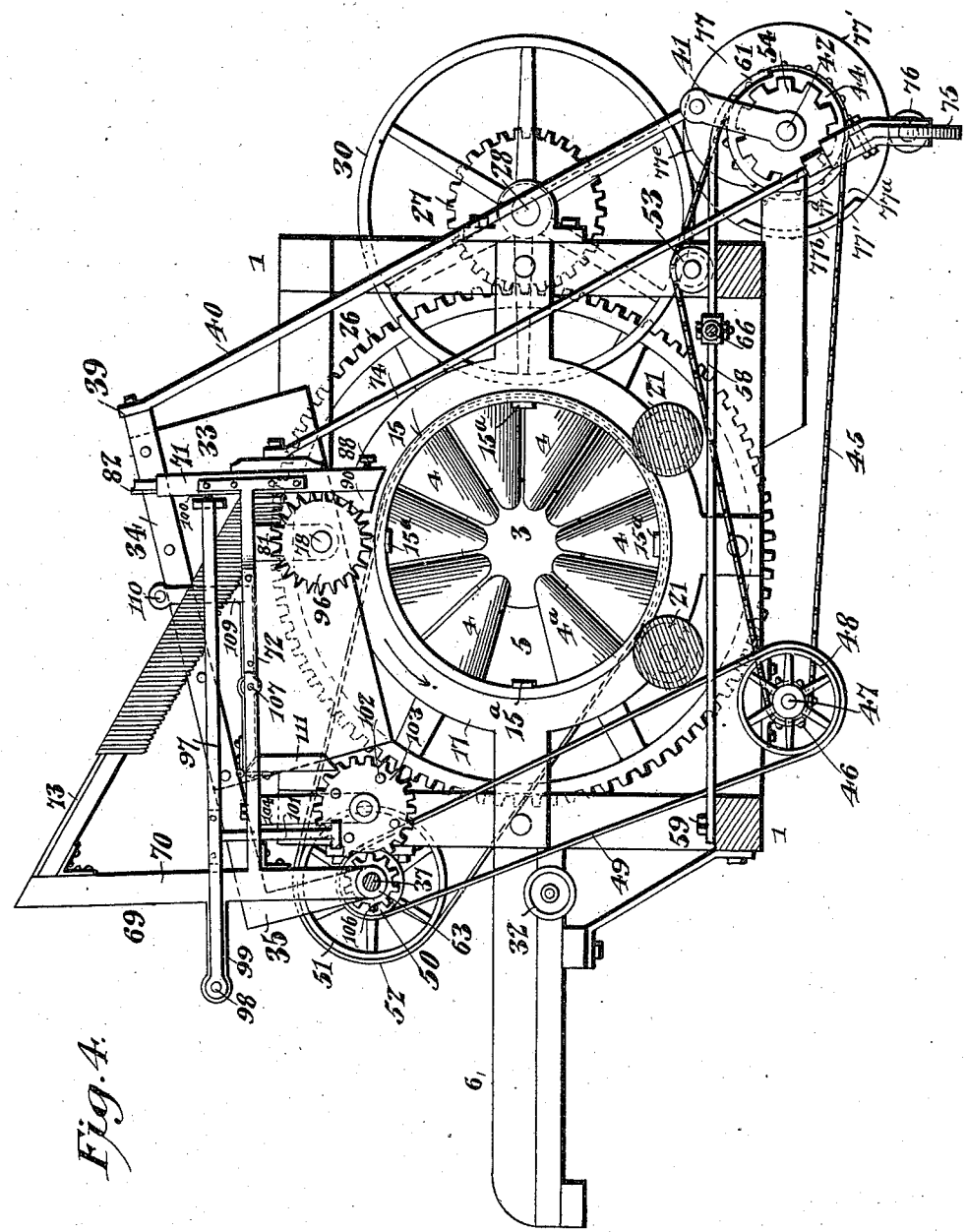

In the accompanying drawings, in which one embodiment of my invention is illustrated, Figure 1 is a plan view of the complete baling apparatus or press. Fig. 2 is a side elevation thereof. Fig. 3 is a vertical section of the major portion of the press on a somewhat enlarged scale. Fig. 4 is a transverse section on an enlarged scale on the line 4—4 of Fig. 1. Fig. 5 is a sectional view showing more particularly the mounting for the rear ends of the compression rolls and the relation of the feed hopper or table thereto. Fig. 6 is a horizontal sectional view showing more particularly the mechanism whereby the discharged bale controls the operation of the cutting and stapling mechanism. Fig. 7 is a detail sectional view of a portion of the controlling mechanism for the cutting and stapling devices. Fig. 8 is a detail perspective view of the controlling cam for the staple frame. Fig. 9 is an elevation of the stapling mechanism showing the parts in the positions they assume during the operation of stapling. Fig. 10 is a sectional view of that portion of the stapling mechanism which effects the removal of the staples from the magazine, and the driving of the staples into the bale. Fig. 11 is a sectional elevation of the stapling mechanism viewed at right angles to Fig. 10, and Fig. 12 is another view of the stapling mechanism designed more particularly to show the relation of the plunger to the swinging staple guide. Fig. 13 is a detail view of the mechanism for starting the staple feed. Fig. 14 is a transverse section on the line 14—14 of Fig. 2, and Fig. 15 is a detail sectional elevation, showing a completed bale and one in process of formation.

Referring to each part by the same reference character throughout the views, 1 indicates the frame structure of the apparatus, the transportation of which is facilitated by supporting wheels 2. At the front end of the frame 1 is formed a trunco-conical baling chamber 3 having a horizontal axis and defined by a series of tapering compression rolls 4 having their axes convergent toward the front of the chamber 3 where the small ends of the rolls are located. While the exact angular relation of diametrically opposite compression rolls is not material, but may be varied within wide limits, I have so disposed the compression rolls that the diameter of the rear end of the compression chamber 3 is about three times the diameter of the front end of said chamber, the compression rolls 4 being proportioned in an approximately similar manner. The rolls 4, while out of contact with each other, are disposed in closely adjacent relation, except at one side of the chamber 3 where the interval between two of the rolls is of sufficient width to form a feed opening or throat 5 through which the material to be baled is drawn into the compression chamber from a suitable source of supply, as for instance, a mass or body of loose material supported by a feed table 6 sustained in any suitable manner on the frame 1 and extended into close proximity to the upper side of that compression roll located at the lower side of the feed openings 5. For convenience in description, the roll thus referred to will be designated by 4ª and termed the initial compression roll or member, since it is between this roll and the body of fiber within the compression chamber that the initial compression of the loose cotton is effected to form a bat or layer.

The compression rolls are formed with front and rear trunnions 7 and 8, the former being afforded bearings in a disk 9 secured to the front end of the frame 1 by arms 10, the disk 9 constituting the front end wall of the compression chamber 3. The rear trunnions 8 of the rolls 4 are afforded bearings in a bearing ring 11 supported in the frame 1 by arms 12, see Figs. 3 and 5. Adjacent to their rear ends the rolls 4 are provided with annular channels 13 to accommodate the flared front end 14 of a hollow rotary drum 15, the front end of which is thus supported by the compression rolls which are driven by the drum as the latter rotates. Rearward endwise movement of the drum 15 is resisted by a thrust bearing 16 comprising opposed bearing members 17 and 18 carried by the drum and frame respectively and formed with channels to receive interposed balls 19. The bearing 16 does not support the drum. On the contrary, the rear end of the drum is formed with a peripheral flange 20 and is supported by the front ends of a pair of bale-supporting rollers 21 provided with annular grooves 22 for the accommodation of the flange 20 on the drum. As shown in Fig. 6, the rollers 21 are provided at their front and rear ends with trunnions 23 and 24 journaled in bearings 25 secured to the frame 1. The rollers 21 are of considerable length, being in fact, somewhat longer than the drum 15 which serves to drive these rollers, as well as the compression rolls 4. In fact, the drum 15 constitutes the prime mover of the entire baling apparatus and may be driven in any suitable manner. By preference the drum 15 is provided with a comparatively large gear wheel 26 meshing with the pinion 27, keyed or otherwise secured to a driving shaft 28 journaled in bearings 29 at one side of the frame 1 and provided with a belt pulley 30 by means of which power is applied to the shaft.

The mechanism thus far described comprehends the baling mechanism proper, and I will now describe the operation of this portion of the apparatus, attention being first directed to the fact that the drum 15 is provided with a series of internal longitudinal ribs or projections 15ª, shown clearly in Figs. 3 and 4.

The machine is first primed by filling the compression or baling chamber 3 and the drum 15 with fiber, so that, as the drum is rotated in the direction of the arrow in Fig. 4, it will rotate the body of fiber within the chamber 3, it being noted that the ribs, projections, or cleats 15ª in the drum compel the contained body of fiber to rotate with the drum while permitting said fiber to move longitudinally through the drum toward the rear end thereof. As the drum rotates in the manner stated, the contained body of fiber and the rolls 4 will rotate in opposite directions, as indicated in Fig. 5. The loose fiber to be baled is now placed on the feed table 6 and advanced through the feed throat or opening 5, where it is caught, as shown in Fig. 5, between the rotating body of cotton and the initial compression roll 4ª. As the fiber within the compression or baling chamber fills the latter, the loose fiber which is drawn into the chamber will be subjected to an initial or detail compression between such rotating body of fiber and the roll 4ª and will assume the form of a bat or web which is carried around within the chamber 3 and subjected to repeated and continued compression between the rotating body of cotton and the successive compression rolls, until it again reaches the roll 4ª, where it becomes enveloped by the next layer and is subjected to continued compression in bulk, that is to say, as an integral part of the now initiated bale as the latter continues to rotate. As this compression continues, the body of fiber compressed within the chamber 3 will seek an outlet, and as the path of least resistance is through the drum 15, the column of fiber will gradually move endwise through the drum, as the continued application of successive layers, to the conical end of the column of fiber, produces the necessary endwise pressure on the bale. The bale-column (to-wit, the cylindrical column of fiber formed by the continuous operation of the press, and capable of being severed into bale-lengths or bales,) emerges from the rear end of the drum 15 and is supported by the rollers 21, which support the rear end of the column and assist in rotating the latter. At this point attention is directed to the fact that the formation of the bale or bale-column is produced by a novel method which may be carried out by other forms of apparatus, said method consisting in rotating a body of fiber to effect an initial or detail compression of a loose fibrous mass to form a bat and in continuing the rotation of such body of fiber under compression to apply thereto the bat so formed and to effect compression in bulk in an angular direction to the axis of the bale-column.

*The regulation of the feed.*—For the purpose of regulating the quantity of material fed to the press, I provide the feed table or hopper 6 with a feed member or regulator 31 hinged at its outer end to the rear wall of the hopper 6, as shown in Fig. 1, and adjusted by a hand-screw 32 by means of which the free end of the board 31 is swung forward or back to diminish or increase the length of the feed opening, or more properly, the width of the body of loose fiber which is admitted to the compression chamber 3. The means for regulating the feed of the fiber to the press also serves to regulate the density of the bale-column, since it will be evident that the maximum diameter of the cone-shaped body of fiber formed within the compression chamber will be regulated in accordance with the position of the feed board 31, inasmuch as the largest portion of such cone-shaped body will be opposite the board and will therefore diminish in size as the board is advanced toward the smaller end of the chamber. If a maximum feed of fiber to the chamber 3 is permitted, the column, as it passes to the drum, will be under high tension, so that a maximum pressure will be required to move the column endwise through the drum and this resistance to the movement of the column will, of course, increase the compression within the chamber 3. If, on the contrary, the feed board is moved toward the small end of the chamber, the larger end of the conical body of fiber formed therein will be of less diameter than the drum, and consequently, as the column of fiber passes into the drum, it will have some opportunity to expand, and its tension or density being decreased, it will require less pressure to move the bale endwise through the drum, and for the same reason, the column of fiber in rear of the compression chamber 3 will oppose less resistance to the accumulation of fiber within said chamber, with the result that the compression of the fiber by the baling mechanism will be decreased. It will therefore be noted that the adjustable feed-board 31 constitutes means for regulating the density or tension of the bale-column, as well as means for regulating the feed or fiber to the press.

*The cutting mechanism.*—As the bale-column is continuously fed rearwardly from the drum 15, it is severed at predetermined intervals into bale-lengths by means of mechanism which operates automatically to perform its function at the proper time without interfering with the rotary and endwise movement of the column of fiber, thus avoiding the necessity for interrupting the operation of the baling mechanism.

The primary element of the cutting mechanism is a knife or cutter 33, see Figs. 2, 3 and 4, sustained above the bale-column immediately in rear of the drum 15 by a swinging cutter bar 34 one end 35 of which is bent downwardly and rearwardly, as shown in Figs. 3 and 4, and is provided with a terminal sleeve 36 slidably mounted on a shaft 37 journaled in bearings 38 projecting beyond the right hand side of the frame 1. At its rear end the cutter bar 34 has a loose pivotal connection, as indicated at 39, with a pitman 40, extended downwardly from the cutter bar and having pivotal connection with a crank 41 keyed or otherwise fixed to a short shaft 42, journaled in bearings 43 projecting from the bottom of the frame 1 adjacent to the left hand side thereof, see Figs. 4 and 7. The shaft 42 is normally stationary, but supports a loose driving member in the form of a sprocket wheel 44 which is continuously rotated by the drum 15 through the instrumentality of the following gearing: A sprocket chain 45 is led around the sprocket 44 and a somewhat smaller sprocket 46 mounted on a short stud-shaft 47 journaled in a suitable bearing at the bottom of the frame 1 and adjacent to the right hand side thereof, as shown in Figs. 3 and 4. The shaft 47 is in turn provided with a belt pulley 48 for the reception of a belt 49 which is carried around a somewhat smaller pulley 50 on the shaft 37. On said shaft is keyed a comparatively large belt wheel 51 by means of which the shaft 37 is driven from the drum 15 through the medium of a belt 52. The upper run of the sprocket chain 45 is led over an idler 53, see Fig. 4. As the drum 15 rotates continuously, it will be seen that the loose driving member 44 geared thereto, will likewise be rotated continuously through the medium of the interposed gearing just described. Therefore, in order to effect the operation of the cutter 33 at the proper time, it is simply necessary to provide automatic means for positively connecting the driving member 44 to the shaft 42 so that the latter will be operated to turn the crank 41 and thus cause the cutter 33 to be drawn down through the bale-column. To accomplish this result, I fix to the driving sprocket 44 or form integral therewith, a clutch member in the form of a notched wheel 54 disposed in position to be engaged by a second clutch member in the form of a plunger 55 slidably mounted in suitable bearings 56 on the crank 41 and urged toward the wheel 54 by a spring 57. Normally, however, the plunger 55 is retained in its elevated or non-engaging position by an element of what may be termed the clutch controlling mechanism, said element being in the form of a swinging bar 58 resting upon the sills of the frame 1, as shown in Fig. 4, and pivoted at its rear end, as indicated at 59. This bar is disposed in the path of a lug or projection 60 extended from the plunger 55, so that, as already stated, the bar 58 normally prevents the downward movement of the plunger to engage the notched wheel 54. The free end of the bar 58 is curved downwardly about the axis of the shaft 42 to form a clutch releasing cam 61.

The operation of the cutting mechanism is as follows: Normally, the parts occupy the positions shown in Figs. 4 and 7, the cutter 33 being elevated and the crank 41 being substantially upright. When a sufficient portion of the bale-column has been fed back beyond the knife, to form a bale, the bar 58 is swung laterally, as shown in dotted lines in Fig. 6, to remove it from the path of the projection 60 on the plunger 55 and thus allow the plunger to drop into engagement with the notched wheel 54. As the crank 41 is fixed to the shaft 42, this engagement of the wheel 54 by the plunger 55 will clutch the shaft 42 to the continuously rotating driving member 44, which will immediately rotate the shaft 42 and with it the crank 41 to cause the cutter 33 to be drawn down through the column of fiber to sever a bale therefrom. It will be noted that as the cutter swings down from an axis eccentric to that of the bale-column, a shearing cut would be obtained in any event, but the cutting operation is further facilitated by the rotation of the column of fiber in a direction opposite to that in which the cutter is swung. It will be noted furthermore, that as the column of fiber is moving longitudinally as well as rotating, it is necessary for the knife to be advanced with the column during the cutting operation. It is for this reason that the cutter bar 54 is slidably mounted on the shaft 37, it being apparent that as the knife is embedded in the column of fiber, it will be carried along by the same, since such lateral movement of the cutter is permitted by the mounting of the cutter bar. When the cutter has completed its descent, the crank 41 will extend downwardly from its axis, and as the shaft 42 continues to rotate, the crank will swing up to elevate the cutter to its normal position. During this upward movement of the crank, the projection 60 on the plunger 65 will come in contact with the clutch releasing cam 61 formed by the front end of the bar 58, and, riding up the latter, will cause the plunger to be completely withdrawn from the notched wheel 54 by the time the crank reaches its normal position, that is to say, by the time the crank 41 has made one complete rotation. It will, of course, be understood that after the bar 58 has been moved to the dotted position in Fig. 7 to release the plunger 55, said bar will be returned to its normal position in time to permit the cam end 61 thereof to disconnect the cutting mechanism from its driving means in the manner stated. As soon as the cutter 33 is elevated to a position above the column of fiber, it will be returned to its normal position at the rear end of the drum by a spring 62 encircling the shaft 37 and bearing at one end against one of the bearings 38 and at its opposite end against a sleeve 63 slidably mounted on the shaft 37 and interposed between the spring 62 and the sleeve 36 of the cutter bar, see Figs. 1 and 3.

*The bale-operated controlling mechanism.*—When a bale is severed from the bale-column, it continues to revolve with the rollers 21 and is pushed back by the bale-column or trunk in process of formation. By the time another bale length has passed the knife, the previously severed bale will have reached the rear end of the press, and will be discharged or dumped therefrom. In the present embodiment of the invention, this discharging or dumping of the bale is utilized to effect the operation of controlling mechanism which serves to automatically bring into action the cutting mechanism which has been described, as well as certain other mechanisms complementary to the baling apparatus proper.

Hinged at the rear end of the frame 1 and below the horizontal plane of the rollers 21, is what may be termed a trip frame 64 adapted to be swung downwardly by the discharged bale, see Fig. 2, and provided with an arm 65 connected to the rear end of a connecting rod 66 which is pivotally connected at its front end to the clutch releasing bar or trip bar 58, see Figs. 6 and 7. The rod 66 passes through a guide bracket 67 and is encircled by a retracting spring 68 bearing at one end against the bracket 67 and at its opposite end against a projection on the rod, see Fig. 2. When the bale moves back a sufficient distance beyond the rollers 21 and is finally overbalanced, it swings down, and, striking the trip arm 64, depresses the latter and causes the connecting rod 66 to swing the bar 58 to the position indicated in dotted lines in Fig. 7, thus permitting the plunger 55 to engage the wheel 54 and inaugurating the operation of the cutting mechanism in the manner heretofore described.

*Means for regulating the lengths of the bales.*—It is desirable to provide means whereby the lengths of the bales may be varied, and this may obviously be accomplished by mechanism which will insure a predetermined advance of the bale-column or trunk between cutting operations. To accomplish this end, I make the rollers 21 extensible so that dumping of the bale in rear of the column may be hastened or delayed, according to the length of bale desired, it being understood that since the falling of the bale controls the operation of the cutting mechanism, the length of the bale will be determined by the variation of the intervals between the dumping operations.

At the rear ends of the trunnions 24 of the rollers 21 are formed supplemental roller sections 21ª, in rear of which are located adjustable roller sections 21ᵇ, provided with stems 21ᶜ which extend through the trunnions 24 and into the rollers 21 and are adjustable longitudinally, being secured in their adjusted positions by set screws 21ᵈ passed through the trunnions 24 and bearing upon the stems 21ᶜ. By adjusting the stems 21ᶜ, the roller sections 21ᵇ may be adjusted forward or back so as to hasten or delay the dumping of the bale. The rollers 21 and the adjustable roller sections 21ᵇ constitute in effect an extensible bale support the length of which will obviously determine the travel of the bale between the cutting operations, and consequently the length of the bale cut from the bale-column.

It is desirable to have the outer end of the drop frame 64 located at the same distance beyond the adjustable roller sections 21ᵇ under all conditions. I therefore prefer to provide the drop frame 24 with an adjustable frame section 64ª comprising a crossbar 64ᵇ and side arms 64ᶜ, the latter being adjustably retained in bearings 64ᵈ on the frame 64 by set screws 64ᵉ. By means of the adjustable section 64ª, the drop frame 64 is made extensible in correspondence with the extensibility of the bale support.

*The stapling mechanism.*—As heretofore stated, the bales produced by the apparatus described are self-bound inasmuch as each convolution of the bat serves to bind the convolutions inclosed thereby, and consequently it is unnecessary to employ the usual ties or casings in order to insure the stability of the bale. It is desirable, however, to provide means for retaining the convolution of the bat at the exterior of the rear end of the bale, in order to counteract any tendency of the latter to unwind when subjected to rough handling. For this purpose, I provide the apparatus with stapling mechanism by means of which a few staples are driven into the periphery of the bale at or adjacent to its rear end, this mechanism acting like all the other complementary parts of the apparatus to perform its function without interrupting the continuous formation of the bale-column.

Sustained at one end by the sleeve 63, which, as heretofore stated, is slidable on the shaft 37, is what may be termed a stapling frame 69 including a standard 70 rising from the sleeve 63, as shown in Fig. 4, a vertically disposed feed chute 71 located above the bale-column, a cross-bar 72 extending between the standard 69 and the chute 71, and a stapling magazine 73 in the form of an inclined bar extended downwardly from the upper end of the standard 70 to the chute 71 at a point below the upper end of the latter, see Figs. 9 and 10. This stapling frame 69 supports the stapling mechanism and is arranged to swing into and out of its operative position, from the shaft 37 as an axis, and, when swung down to its operative position, is designed to move laterally with the advancing and rotating bale, this lateral movement of the stapling mechanism being permitted by the slidable mounting of the sleeve 63 on the shaft 37. The lateral movement of the stapling mechanism when in its operative position enables it to drive several staples into the bale during the movement of the latter. The side of the stapling frame 69 opposite the shaft 37 is supported by a rod 74 connected at its upper end to the frame and at its lower end to a cam controlled lever 75, see Figs. 4 and 7. The lever 75 is fulcrumed intermediate of its ends upon one of the bearing brackets 43 and is provided at its front end with a roller 76 which normally bears against the periphery of a rotary cam 77 which is fixed to the shaft 42 and controls the movement of the stapling frame to and from its operative position, see Figs. 7 and 8. Substantially one-half of the periphery of the cam 77 is concentric with its axis to form what may be termed an outer dwell 77'. Opposite the dwell 77' the cam is formed with a channel 77ª the outer side of which is defined by a guard flange 77ᵇ. The wall of the cam opposite the guard flange is shaped to form a sudden drop 77ᶜ at the entrance to the channel 77ª, an inner dwell 77ᵈ being concentric with the axis of the cam and extending from the drop 77ᶜ to an eccentric surface or cam face 77ᵉ which extends from one end of the dwell 77ᵈ to the adjacent end of the outer dwell 77'. The cam 77 being fixed to the shaft 42, is normally stationary and assumes approximately the position shown in Fig. 8 with the roller 77 of the lever 75 bearing against the lower end portion of the dwell 77'. As soon as the dumping of a bale causes the shaft 42 to be clutched to the driving mechanism in the manner heretofore stated, the cam 42 will rotate and the cam turning with the shaft, will present the entrance to the channel 77ª opposite the roller. The lever 75 being thus released, the stapling frame 69 will drop to its operative position, shown in Fig. 9, its downward movement being arrested by the inner dwell 77ᵈ of the cam with which the roller 76 will now contact. The stapling mechanism will operate in a manner to be described to apply the staples to a bale, and by the time this operation is completed, the rotation of the cam 77 will present the advancing end of the cam face 77ᵉ to the roller 76, and as the cam continues to rotate, the face 77ᵉ will urge the roller 76 downwardly, thus swinging the lever 75 to elevate the stapling mechanism to its inoperative position, shown in Fig. 4. When the stapling frame has been elevated, the advancing end of the outer dwell 77' of the cam will be presented to the roller 76 and the cam will continue to rotate until it reaches its normal position, without effecting any further movement of the stapling frame. As the cam reaches its normal position, the shaft 42 will be automatically released from the driving mechanism in the manner already described, and the stapling mechanism, like the cutting mechanism, will remain in inoperative position until another bale-length has been fed back from the drum.

As heretofore stated, the stapling mechanism proper, or that group of elements which actually effects the application of the staples to the bale, is mounted on the stapling frame 69. The primary element of this stapling mechanism is a rotary staple driver 78 formed with peripheral teeth 79 defining interdental spaces 80. The driver 78 is rotatably mounted in a bracket 81 depending from the cross-bar 72 of the stapling frame, and when the frame 69 is in its depressed or operative position, as shown in Fig. 9, the teeth of the driver extend into the periphery of the bale directly above which the driver is located. The driver will, therefore, rotate with the bale and will serve to apply thereto such staples as are presented between the teeth of the driver, at the descending side thereof, from the feed chute 71. Within this chute 71 is mounted a vertically reciprocatory feed plunger 82 which feeds the staples one at a time from the magazine 73 to the driver 78. To prevent the staples from dropping down through the feed chute when the plunger 82 is elevated, I employ a guard 83 hinged at its lower edge and having its upper edge disposed to form a continuation of the lower end of the magazine. The guard 83 is yieldingly urged toward the back wall of the chute 71 by a spring 84 so that, when the plunger is elevated above the guard, the latter will move back across the chute and thus prevent the premature dropping of the staple. The upper edge of the guard is beveled, as indicated at 85, so that, as the plunger descends upon the most advanced staple, the guard will readily yield to permit said staple to be forced down past the guard. The staple thus urged into the chute by the plunger will drop down along the face of a swinging guide 86 hinged at its upper edge, as indicated at 87, and adapted to be adjusted to various angular positions by a guide adjusting screw 88 passed through the back wall of the chute 71 and bearing against the lower end of the guide 86. The inclination of the guide 86 determines the inclination at which the staples enter the bale, and it is for the purpose of regulating such angle that the guide 86 is made adjustable. When a staple is forced off of the guard 83 by the plunger 82, it drops down the chute 71 until arrested by one of the teeth of the staple driver 78. As the driver rotates in the direction of the arrow in Fig. 10, the staple is carried down, its legs or prongs following the inclination of the guide 86 and its cross-bar moving along the curved edge faces 89 of two fixed staple guides 90 extended at opposite sides of the driver 78 from the chute structure 71, see Figs. 9, 10 and 11. The edge faces 89 of the guides 90 are so formed that as a staple travels down toward the bale the cross-bar of the staple will be urged inwardly toward the bottom of the interdental space in the driver so as to insure an effective engagement between the staple and that tooth of the driver which is adapted to force it into the bale. The guide 86 is substantially U-shaped, as shown in Fig. 12, in order to present its side portions at opposite sides of the driver, and arranged to coöperate with this guide are a pair of swinging staple guards 91 hinged at their upper ends, as indicated at 92, and located at opposite sides of the driver 78. The guards 91 are designed to hold the staples flat against the guide 86 until the staples engage the bale. Each guard is therefore urged toward the guide by a spiral spring 93 bearing at one end against the guard and at its outer end against a nut 94 screwed on a stem 95 which projects outwardly from the chute structure 71 and passes through the guard, see Figs. 9 and 11. When the staple has descended a sufficient distance to engage the bale it will move away from the guide 86 by the combined action of the bale and driver, the guards 91 being carried back by the staple, as indicated in Fig. 10, against the resistance of the springs 93. When the staple passes beyond the lower ends of the guards, the latter will swing back to the guides 86 to engage the next succeeding staple.

As already stated, the staple driver 78 is driven by the bale, the surface of which is entered by the teeth 79. I have found, however, that in order to obtain maximum efficiency of the driver for engaging and urging the staples, it is necessary to so form the teeth 79 as to interfere somewhat with their functions as connecting devices between the bale and driver. It is preferable, therefore, to extend somewhat the shaft $78^a$ of the driver 78 and to provide thereon a driving wheel 96 having long sharp pointed teeth which will readily enter the surface of the bale and cause the latter to positively operate the driver 78, see Figs. 1 and 11.

The number of staples driven into each bale obviously depends upon the number of reciprocations imparted to the plunger 82 while the stapling mechanism is in its operative position. The plunger is reciprocated by a plunger operating lever 97 fulcrumed at one end, as indicated at 98, on a bracket 99 carried by the standard 70. At its opposite end the lever 79 engages a pin 100 extended from the plunger 82, as shown in Fig. 10. The lever 97 at a point nearer its fulcrum has a tappet arm 101 disposed to be engaged and elevated by tappets 102 projecting from one side of a tappet wheel 103 mounted in a bracket 104 depending from the cross-bar 72 of the stapling frame. The tappet wheel 103 is in the form of a mutilated gear, having a short gap 105 in its peripheral series of teeth and arranged to be driven by a pinion 106 fixed on the shaft 37 and rotating continuously therewith. As the tappet wheel 103 rotates in the direction of the arrow in Fig. 9, the tappets 102 will be successively presented to the lower end of the tappet arm 101 to elevate the lever 97 and the plunger 82. As the rotation of the tappet wheel continues, the tappet will pass beyond the tappet arm 101 thus allowing the plunger to drop down for the purpose of feeding a staple from the magazine to the driver, and this operation will be repeated as many times as there are tappets 102 on the tappet wheel. When the wheel 103 has made one complete rotation, the gap 105 will arrive opposite the pinion 106, and the staple feeding mechanism will thus be rendered inoperative. When the operation of the feeding mechanism is thus terminated, the face $77^e$ of the cam 77 will cause the elevation of the stapling frame to its inoperative position in the manner heretofore described, the spring 62 serving to urge the frame back toward the drum until it reaches its normal position. When the stapling frame is again swung down to its operative position, to staple the next bale, the operation of the staple feeding mechanism is inaugurated by means of the following instrumentalities: Fulcrumed on the cross-bar 72 of the stapling frame, as indicated at 107, is a starting lever 108 from one end of which rises an arm 109 provided at its upper extremity with a pin 110 which extends over the cutter bar 34, see Figs. 1, 4 and 9. At the opposite end of the lever 108, is a pawl 111 which normally engages a tooth of the tappet wheel 103. Bearing in mind the fact that the gap 105 of the tappet wheel 103 is located opposite the pinion 106, it will be noted that when the stapling frame 69 is dropped down, the pin 110 will be retarded by its engagement with the cutter bar 36, and the starting lever 108 will therefore be caused to swing relative to the bar 72. This movement of the lever will cause the pawl 111 to advance the tappet wheel 103 sufficiently to bring the teeth thereof into mesh with the teeth of the pin 106 so that by the time the driver 78 reaches its operative position the staple feeding mechanism will be set in motion to feed staples to the driver from the magazine.

Attention is directed to the fact that the movement of the stapling mechanism to its operating position is quite sudden, by reason of the abrupt drop $77^c$ of the cam 77, whereas, the downward movement of the cutting mechanism is comparatively gradual by reason of the downward swing of the crank 41: therefore the bale will be stapled immediately before it is severed from the column of fiber.

In conclusion, attention is directed to the fact that the drum 15, which directly engages and rotates the column of fiber, also positively drives the various mechanisms which are combined in the apparatus to perform the necessary functions, that is to say, the drum rotates not only the column of fiber, but also the compression or bale forming mechanism, the stapling mechanism, and the cutting mechanism, the operations of the two mechanisms last named being intermittent and controlled by the discharged bales through the medium of controlling mechanism which automatically connects the drum with the stapling and cutting mechanisms at the proper time. Attention is also directed to the fact that since the loose mass of cotton is presented directly to the rotating body of cotton within the compression chamber, said body not only serves as a compression member for converting the incoherent mass of cotton into a coherent bat or sheet, but also serves the additional purpose of winding the bat or sheet thus formed upon itself to constantly augment the rotating body for the purpose of continuously forming the bale-column.

It is thought that from the foregoing description, the construction and operation of the apparatus, as well as the advantages accruing therefrom, will be readily comprehended. It should be distinctly understood, however, that while the illustrated embodiment of the invention is thought at this time to be preferable, I desire to reserve the right to effect such changes, modifications, and variations of the illustrated structure as may come fairly within the scope of the protection prayed.

What I claim is:—

1. In a baling apparatus, an annular series of compression rolls inclosing a compression chamber, and means arranged to operate said rolls and to support a column of baled material extending from said chamber.

2. In a bale apparatus, a series of compression rolls inclosing a compression chamber, a hollow rotary drum arranged in operative relation with said rolls for their rotation and to receive the baled material from the compression chamber, and means for rotating the drum.

3. In a baling apparatus, an annular series of tapered compression rolls having converging axes and inclosing a tapered compression chamber, and a rotary drum located beyond the larger end of the compression chamber to receive a column of baled material extended therefrom and to rotate said column.

4. In a baling apparatus, an annular series of tapered compression rolls inclosing a tapered compression chamber, and a rotary hollow drum located beyond the larger end of the compression chamber to receive and rotate the column of baled material and arranged to rotate the compression rolls.

5. In a baling apparatus, an annular series of compression rolls having converging axes, and a rotary drum having a flared end surrounded by the compression rolls and arranged to receive a column of baled material therefrom.

6. In a baling apparatus, an annular series of tapered compression rolls having converging axes and surrounding a tapered compression chamber, and a rotary drum having a flared end surrounded by and in operative engagement with the rear ends of the compression rolls.

7. In a baling apparatus, an annular series of tapered compression rolls surrounding a tapered compression chamber and having annular grooves adjacent to their rear ends, and a rotary drum having a flared front end extended between the compression rolls and into the annular grooves thereof.

8. In a baling apparatus, the combination with compression mechanism, rotary bale supporting means, and a hollow rotary drum through which the baled material passes from the compression mechanism to said supporting means.

9. In a baling apparatus, the combination with an annular series of tapered compression rolls inclosing a tapered compression chamber, of a hollow rotary drum extended rearwardly from said rolls, and supporting rollers extended rearwardly from the drum.

10. In a baling apparatus, an annular series of tapered compression rolls inclosing a tapered compression chamber, a hollow rotary drum extended rearwardly from the compression chamber and arranged to operate the compression rolls, and supporting rollers extended beyond the rear end of the drum and rotated thereby.

11. In a baling apparatus, the combination with an annular series of tapered compression rolls inclosing a tapered compression chamber, of a rotary support located beyond the compression chamber to receive the baled material, and an intermittently operating cutter for severing the column of baled material into bale-lengths.

12. In a baling apparatus, an annular series of tapered compression rolls inclosing a tapered compression chamber, a hollow rotary drum arranged to receive a column of baled material from the compression chamber, and an automatically operated cutter in rear of the drum.

13. In a baling apparatus, the combination with a cutter arranged to sever the baled material into bale-lengths, of means operated by a discharged bale for bringing the cutter into action.

14. In a baling apparatus, a cutter for the baled material, driving means for the cutter, a clutch controlling the connection between the cutter and the driving means, and tripping mechanism controlling the operation of the clutch.

15. In a baling apparatus, a movable cutter for the baled material, driving means for the cutter, and a trip device controlling the connection between the driving means and the cutter and arranged to be operated by a bale discharged from the apparatus.

16. In a baling apparatus, a cutter for the baled material, driving means for the cutter, a clutch controlling the connection between the driving means and the cutter, and a movable trip frame controlling the operation of the clutch and located at the discharge end of the apparatus to be operated by a discharged bale.

17. In a baling apparatus, a cutter for the baled material, means for operating the cutter, and means controlling the operation of the cutter, said controlling means including a swinging trip frame located at the discharge end of the apparatus to be operated by a discharged bale.

18. In a baling apparatus, a cutter for the baled material, normally disconnected driving means for the cutter, and means for automatically connecting the driving means with the cutter, said means including an extensible trip frame mounted at the discharge end of the apparatus to be operated by a discharged bale.

19. In a baling apparatus, a cutter for the baled material, driving means for the cutter, a clutch controlling the connection between the driving means and the cutter, a trip bar controlling the operation of the clutch, and a swinging trip frame connected to the trip bar and located at the discharge end of the apparatus to be operated by a discharged bale.

20. In a baling apparatus, a cutter for the baled material, driving means for the cutter, a clutch controlling the connection between the driving means and the cutter, and a movable trip bar normally retaining the clutch members in disengaged relation, said trip bar being movable to permit the clutch members to be engaged and provided with a cam arranged to automatically restore the clutch members to their disengaged condition at the completion of the cutting operation.

21. In a baling apparatus, a cutter for the baled material, a shaft provided with a crank connected to the cutter to operate the same, driving means normally disconnected from the shaft, and means for automatically connecting the driving means with the shaft to inaugurate the cutting operation and for automatically disconnecting the driving means and shaft when the cutting operation is completed.

22. In a baling apparatus, the combination with compression mechanism, of a rotary drum disposed to receive the baled material from the compression mechanism, a cutter located in rear of the drum, means for driving the cutter from the drum, and means for controlling the operation of the cutter.

23. In a baling apparatus, the combination with compression mechanism, of a rotary drum disposed to receive the baled material therefrom, a cutter located in rear of the drum, and means operated by a discharged bale for causing the cutter to be operated by the drum.

24. In a baling apparatus, the combination with compression mechanism, of a rotary drum operating the compression mechanism and arranged to receive the baled material therefrom, a cutter located in rear of the drum, and automatic means for connecting the cutter with the drum to be operated thereby, said means including a trip frame located at the discharge end of the apparatus, to be operated by a discharged bale.

25. In a baling apparatus, the combination with compression mechanism, of a support located in rear thereof to receive a column of baled material, cutting mechanism for severing said column into bale-lengths, mechanism controlling the operation of the cutter and disposed to be operated by a discharged bale, and adjustable means for determining the point at which the bale will be discharged, to regulate the intervals between the operations of the cutter, and the lengths of the bales.

26. In a baling apparatus, the combination with compression mechanism, of an extensible bale support arranged to receive the baled material from the compression mechanism, a cutter arranged to sever the baled material into bale-lengths, and means controlling the operation of the cutter and disposed to be operated by a bale as the latter is discharged from the extensible support.

27. In a baling apparatus, the combination with compression mechanism, of a horizontally disposed extensible support arranged to receive the baled material, a cutter arranged to sever the baled material into bale-lengths, and means controlling the operation of said cutter, said means including an extensible trip device disposed below the discharge end of the extensible support and arranged to be operated by a bale discharged from said support.

28. In a baling apparatus, the combination with compression mechanism, of a rotary drum disposed in rear thereof to receive the baled material, a pair of bale supporting rollers extended rearwardly from the drum, adjustable roller sections located at the rear ends of the rollers, a trip frame located at the rear ends of the rollers and disposed to be operated by the discharged bale, cutting mechanism located in rear of the drum, and means controlling the operation of the cutter and operated by the trip frame.

29. In a baling apparatus, the combination with compression mechanism, of a rotary hollow drum disposed in rear thereof and arranged to operate the compression mechanism, a pair of bale supporting rollers extended rearwardly from the drum and operated thereby, a trip frame located in rear of said rollers to be operated by a discharged bale, cutting mechanism located in rear of the drum, and means operated by the trip frame to cause the drum to operate the cutting mechanism when a bale is discharged.

30. In a baling apparatus, the combination with mechanism for forming a bale, layer upon layer, of means for inserting staples in said bale to prevent the separation of the layers.

31. In a baling apparatus, the combination with bale forming mechanism, of stapling mechanism, and means for intermittently operating the stapling mechanism to staple the bale.

32. In a baling apparatus, the combination with baling mechanism, of stapling mechanism, and means operated upon the discharge of a bale from the apparatus to bring the stapling mechanism into action.

33. In a baling apparatus, the combination with means for forming a bale-column made up of fiber disposed layer upon layer, of means for applying staples to said bale-column during the continuous formation thereof.

34. In a baling apparatus, the combination with means for forming a rotating and endwise moving bale-column, of means for applying staples to said column during the movement thereof.

35. In a baling apparatus, the combination with means for continuously forming a bale-column, of stapling mechanism movable with the bale-column in the direction of its endwise advance, and means for operating the stapling mechanism during such movement to effect the application of a staple to the bale-column.

36. In a baling apparatus, the combination with means for forming a bale-column, of normally inoperative stapling mechanism therefor, and means controlling the operation of the stapling mechanism and including a trip device arranged to be operated by a discharged bale.

37. In a baling apparatus, the combination with bale forming mechanism, of a movable stapling frame, stapling mechanism mounted on the frame and movable into and out of operative position therewith, and automatic means controlling the movement of the frame.

38. In a baling apparatus, the combination with bale forming mechanism, of stapling mechanism, a stapling frame supporting the stapling mechanism and movable to present the same in or out of operative position, and a cam controlling the movement of the stapling frame.

39. In a baling apparatus, the combination with bale forming mechanism, of a stapling frame, stapling mechanism carried by the frame and movable therewith into and out of operative position, a normally stationary cam controlling the movement of the stapling frame, means for driving the cam, and means controlling the connection between the cam and the driving means.

40. In a baling apparatus, the combination with bale forming mechanism, of stapling mechanism, a stapling frame carrying said mechanism and movable to bring the same into or out of operative position, a normally stationary cam controlling the movement of the stapling frame, driving means for the cam, and automatically operated mechanism controlling the connection between the driving mechanism and the cam.

41. In a baling apparatus, the combination with bale forming mechanism, of stapling mechanism, a movable stapling frame supporting the stapling mechanism, a cam controlling the movement of said frame, driving mechanism for the cam, and means controlling the connection between the cam and its driving mechanism, said means including a device located at the discharge end of the apparatus and disposed to be operated by a discharged bale.

42. In a baling apparatus, the combination with bale forming mechanism, of stapling mechanism movable into and out of operative position, and means controlling such movement and including a swinging trip frame located at the discharge end of the apparatus.

43. In a baling apparatus, a stapling mechanism including a rotary driver, and means for feeding staples thereto.

44. In a baling apparatus, a stapling mechanism including a rotary driver, a staple magazine, and means for feeding staples one at a time to said driver from the magazine.

45. In a baling apparatus, a stapling mechanism including a tappet member, staple feeding mechanism operated thereby, and a driver arranged to receive the staples from the feeding mechanism.

46. In a baling apparatus, a stapling mechanism including a driver, a magazine, a staple feeding member arranged to feed the staples one at a time from the magazine to the driver, a wheel provided with tappets, and a lever connected to the staple feeding member and provided with a tappet arm disposed to be engaged by the tappets.

47. In a baling apparatus, a stapling mechanism, including a bale operated driver, and means for feeding staples to the driver.

48. In a baling apparatus, the combination with means for forming and rotating a bale-column, of stapling mechanism including a rotary driver operated by the movement of the bale, a staple magazine, and means for feeding the staples one at a time to the driver from said magazine.

49. In a baling apparatus, a stapling mechanism, including a driver, a staple magazine, a staple feeding member, a mutilated gear provided with tappets, a pinion for operating said gear, and means operated by the tappets to actuate the feeding member.

50. In a baling apparatus, a stapling mechanism, the combination with a driver, a staple magazine, staple feeding mechanism including a mutilated gear, a pinion for driving said gear, and automatic means for moving the gear into mesh with the pinion.

51. In a baling apparatus, a stapling mechanism, the combination with a driver, a staple magazine, a member for feeding staples from the magazine to the driver, and means for operating said member, said means including a tappet wheel provided with a mutilated gear, a pinion for operating the gear but normally out of mesh therewith, and an automatically operated starting lever for rotating the gear into mesh with the pinion.

52. In a baling apparatus, the combination with a movable stapling frame, of normally inoperative stapling mechanism carried thereby and movable into and out of operative position, therewith, said mechanism including staple feeding means, and means operated by the movement of the stapling frame for inaugurating the action of the staple feeding means.

53. The combination with means for forming and rotating a bale-column, of a movable stapling frame, stapling mechanism movable with the frame and including a rotary staple driver operated by the bale and presented thereto by the movement of the frame, a staple magazine, and means for feeding staples from the magazine to the driver.

54. The combination with means for forming and rotating a bale-column, of a movable stapling frame, stapling mechanism mounted thereon and including a rotary bale operated driver, a staple magazine, a staple feeding device, and means operated by the movement of the stapling frame for bringing the feeding device into operation.

55. In a baling apparatus, a stapling mechanism including a rotary driver having interdental spaces for the reception of staples, and a staple guide for preventing premature disengagement of the staples from the driver.

56. In a baling apparatus, a stapling mechanism including a rotary driver, a feed chute leading to the driver, a magazine leading to the feed chute, and a feeding device for feeding the staples one at a time from the magazine to the chute.

57. In a baling apparatus, a stapling mechanism including a driver, a magazine, a feed chute leading from the magazine to the driver, a movable guard arranged to prevent premature feeding of the staples, and a feeding member arranged to move the staples one at a time past the guard and into the chute.

58. In a baling apparatus, a stapling mechanism, the combination with a rotary driver having interdental spaces for the reception of staples, of fixed guides preventing disengagement of the staples from the driver, and an adjustable guide engaging the staples to determine the angle at which said staples will enter the body stapled.

59. In a baling apparatus, a stapling mechanism, the combination with a rotary driver having interdental spaces for the reception of staples, of fixed guides preventing disengagement of the staples from the driver, an adjustable guide engaging the staples to determine the angle at which said staples will enter the body stapled, and a movable guard arranged to retain the staple in proper relation to the adjustable guide.

60. In a baling apparatus, the combination with means for forming a bale-column, of mechanism for applying staples to said column, and mechanism for cutting the column into bale-lengths.

61. In a baling apparatus, the combination with means for forming a bale-column, of mechanisms for cutting and stapling said column, and controlling means common to said mechanisms.

62. The combination with means for forming a bale-column, of cutting and stapling mechanisms for said column, and means for automatically bringing the cutting and stapling mechanisms into operation at the proper time.

63. The combination with means for forming a bale-column, of cutting and stapling mechanisms for the column, and means operated by a discharged bale for bringing the cutting and stapling mechanisms into action.

64. The combination with means for forming a bale-column, of cutting and stapling mechanisms for the column, and means for controlling the operation of the cutting and stapling mechanisms, said means including a movable trip device located at the discharge end of the apparatus to be operated by a discharged bale.

65. The combination with means for continuously forming a rotating and endwise moving bale-column, of means operating during the movement of the column to apply staples thereto and means for severing the column.

66. In a baling apparatus, the combination with means for forming a rotating and endwise moving bale-column, of stapling and cutting mechanisms movable with the column in its endwise advance and operating during such movement to apply staples to the column and to sever the same into bale-lengths.

67. In a baling apparatus, the combination with means for rotating a column, of means for applying staples to said column during the rotation thereof.

68. In a baling apparatus, the combination with means for rotating a body, of means for applying staples to said body during the rotation thereof, and means also acting during the rotation thereof to sever the column.

69. In a baling apparatus, the combination with mechanism for forming a bale layer upon layer, of means for inserting retainers endwise in the side of the bale to prevent the separation of the layers.

70. In a baling apparatus, baling mechanism, a cutter arranged to be operated by the baling mechanism, a bale support arranged to be moved by the weight of a bale, and means operated by the bale support to bring the cutter into action.

In testimony, that I claim the foregoing as my own, I have hereto affixed my signature in the presence of two witnesses.

THOMAS A. KILLMAN.

Witnesses:
ED. EVARUS,
D. W. FLOYD.